United States Patent
Liu et al.

(10) Patent No.: US 10,935,975 B2
(45) Date of Patent: Mar. 2, 2021

(54) METHOD AND SYSTEM FOR MODELING AUTONOMOUS VEHICLE BEHAVIOR

(71) Applicant: TuSimple, Inc., San Diego, CA (US)

(72) Inventors: Liu Liu, San Diego, CA (US); Che Kun Law, San Diego, CA (US); Ke Quan, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 346 days.

(21) Appl. No.: 15/853,496

(22) Filed: Dec. 22, 2017

(65) Prior Publication Data

US 2019/0196468 A1  Jun. 27, 2019

(51) Int. Cl.
*G05D 1/00* (2006.01)
*G06Q 10/00* (2012.01)
(Continued)

(52) U.S. Cl.
CPC ....... *G05D 1/0088* (2013.01); *G01C 21/3635* (2013.01); *G05D 1/0212* (2013.01);
(Continued)

(58) Field of Classification Search
CPC .. G05D 1/0088; G05D 1/0221; G05D 1/0212; G05D 2201/0213;
(Continued)

(56) References Cited

U.S. PATENT DOCUMENTS 9,650,042 B2 * 5/2017 Sujan .................. G06Q 10/047
2014/0163779 A1 * 6/2014 Braunstein ............ E02F 9/2054
701/2
(Continued)

OTHER PUBLICATIONS

Vanderbilt, T., "Autonomous Cars Through the Ages," Wired, available at https://www.wired.com/2012/02/autonomous-vehicle-history/.
(Continued)

*Primary Examiner* — Frederick M Brushaber
(74) *Attorney, Agent, or Firm* — Paul Liu; Perkins Coie LLP

(57) ABSTRACT

A Method and System for Modeling Autonomous Vehicle Behavior. The system and method makes it feasible to develop an autonomous vehicle control system for complex vehicles, such as for cargo trucks and other large payload vehicles. The method and system commences by first obtaining 3-dimensional data for one or more sections of roadway. Once the 3-dimensional roadway data is obtained, that data is used to run computer simulations of a computer model of a specific vehicle being controlled by a generic vehicle control algorithm or system. The generic vehicle control algorithm is optimized by running the simulations utilizing the 3-dimensional roadway data until an acceptable performance result is achieved. Once an acceptable simulation is executed using the generic vehicle control algorithm, the control algorithm/system is used to run one or more real-world driving tests on the roadway for which the 3-dimensional data was obtained. Finally, the computer model for the vehicle is modified, if necessary (without modifying the control algorithm), until the real-world driving performance is acceptable.

20 Claims, 4 Drawing Sheets

(51) Int. Cl.
*G05D 1/02* (2020.01)
*G01C 21/36* (2006.01)
*G06T 17/05* (2011.01)

(52) U.S. Cl.
CPC ........... *G05D 1/0221* (2013.01); *G06Q 10/00* (2013.01); *G06T 17/05* (2013.01); *G05D 2201/0212* (2013.01); *G05D 2201/0213* (2013.01)

(58) Field of Classification Search
CPC ............ G05D 2201/0212; G06Q 10/00; G06T 17/05; G01C 21/3635
See application file for complete search history.

(56) References Cited

U.S. PATENT DOCUMENTS

| | | | | |
|---|---|---|---|---|
| 2014/0163805 | A1* | 6/2014 | Braunstein | E02F 9/265 701/23 |
| 2015/0149088 | A1* | 5/2015 | Attard | G05D 1/021 701/538 |
| 2015/0210285 | A1* | 7/2015 | Denaro | B60W 10/10 701/45 |
| 2016/0075333 | A1* | 3/2016 | Sujan | B60W 10/02 701/25 |
| 2016/0358477 | A1* | 12/2016 | Ansari | G06Q 30/0251 |
| 2017/0090478 | A1* | 3/2017 | Blayvas | G07C 5/0808 |
| 2017/0364776 | A1* | 12/2017 | Micks | G01S 13/006 |
| 2018/0148068 | A1* | 5/2018 | Dai | B60W 10/184 |
| 2018/0203445 | A1* | 7/2018 | Micks | G06F 30/20 |
| 2019/0050520 | A1* | 2/2019 | Alvarez | G06F 30/20 |
| 2019/0101917 | A1* | 4/2019 | Yao | B60W 30/0953 |
| 2019/0187705 | A1* | 6/2019 | Ganguli | B60W 30/12 |
| 2019/0187706 | A1* | 6/2019 | Zhou | G05D 1/0088 |
| 2019/0187707 | A1* | 6/2019 | Zheng | G01C 21/3602 |
| 2019/0187708 | A1* | 6/2019 | Zheng | B60W 50/082 |
| 2019/0196468 | A1* | 6/2019 | Liu | G06Q 10/00 |
| 2019/0243375 | A1* | 8/2019 | Stenneth | G01C 21/32 |
| 2019/0369626 | A1* | 12/2019 | Lui | G05D 1/0219 |
| 2020/0132477 | A1* | 4/2020 | Averilla | G01C 21/16 |

OTHER PUBLICATIONS

"History of self-driving cars," Wikipedia, available at https://en.wikipedia.org/wiki/History_of_self-driving_cars.

\* cited by examiner

METHOD AND SYSTEM FOR MODELING AUTONOMOUS VEHICLE BEHAVIOR

BACKGROUND OF THE INVENTION

1. Field of the Invention

This invention relates generally to control systems for vehicles and, more specifically, to a Method and System for Modeling Autonomous Vehicle Behavior.

2. Description of Related Art

Experiments have been conducted on automating cars since at least the 1920s. The idea of autonomous vehicles gained widespread public exposure at GM's Futurama exhibit at the 1939 World's Fair, where the automaker envisioned "abundant sunshine, fresh air [and] fine green parkways" upon which cars would drive themselves.[1]

www.wired.com/2012/02/autonomous-vehicle-history/

The first self-sufficient and truly autonomous cars appeared in the 1980s, with Carnegie Mellon University's Navlab and ALV projects in 1984 and Mercedes-Benz and Bundeswehr University Munich's Eureka Prometheus Project in 1987. In 1995, Carnegie Mellon University roboticists drove NavLab 5, a 1990 Pontiac Trans Sport, from Pittsburgh to Los Angeles on a trip billed, "No Hands Across America."[2]

Ibid

Since then, numerous major companies and research organizations have developed working prototype autonomous vehicles including Mercedes-Benz, General Motors, Continental Automotive Systems, Autoliv Inc., Bosch, Nissan, Toyota, Audi, Volvo, Vislab from University of Parma, Oxford University and Google. In July 2013, Vislab demonstrated BRAiVE, a vehicle that moved autonomously on a mixed traffic route open to public traffic.

As of 2013, four U.S. states have passed laws permitting autonomous cars: Nevada, Florida, California, and Michigan. In Europe, cities in Belgium, France, Italy and the UK are planning to operate transport systems for driverless cars, and Germany, the Netherlands, and Spain have allowed testing robotic cars in traffic.[3]

Wikipedia "The History of autonomous cars"

In the last five years, Google's fleet of autonomous vehicles (Toyota Prius's) are reported to have logged more than a combined 140,000 miles while utilizing Google Street View, coupled with RADAR, LIDAR[4] and cameras.

[4] "Light Detection and Ranging"—pulsed laser light used to measure ranges

It is believed that the vast majority of these prior autonomous driving systems was confined to passenger vehicles of relatively modest size and weight. Because the performance of these vehicles is very predictable (due to their relatively low weight), it is believed that the vehicle control systems are developed utilizing 2-dimensional road maps. While this approach appears to be quite successful with passenger vehicles, it has been proven to provide unacceptable results when larger vehicles are being automated. Because the power-to-weight ratio of cargo vehicles is much smaller than it is with passenger vehicles, additional road information is necessary before a successful control algorithm can be developed for a particular vehicle on a particular stretch of roadway.

SUMMARY OF THE INVENTION

In light of the aforementioned problems associated with the prior systems and methods, it is an object of the present invention to provide a Method and System for Modeling Autonomous Vehicle Behavior. One primary purpose of the system and method is to make it feasible to develop an autonomous vehicle control system for complex vehicles, such as for cargo trucks and other large payload vehicles. The method and system should commence by first obtaining 3-dimensional data for one or more sections of roadway. Once the 3-dimensional roadway data is obtained, that data should be used to run computer simulations of a computer model of a specific vehicle being controlled by a generic vehicle control algorithm or system. The generic vehicle control algorithm should be optimized by running the simulations utilizing the 3-dimensional roadway data until an acceptable performance result is achieved. Once an acceptable simulation is executed using the generic vehicle control algorithm, the control algorithm/system should undergo a real-world driving test on the roadway for which the 3-dimensional data was obtained. Finally, the computer model for the vehicle should be modified (without modifying the control algorithm) until the real-world driving performance is acceptable.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and System for Modeling Autonomous Vehicle Behavior.

Figure 1:
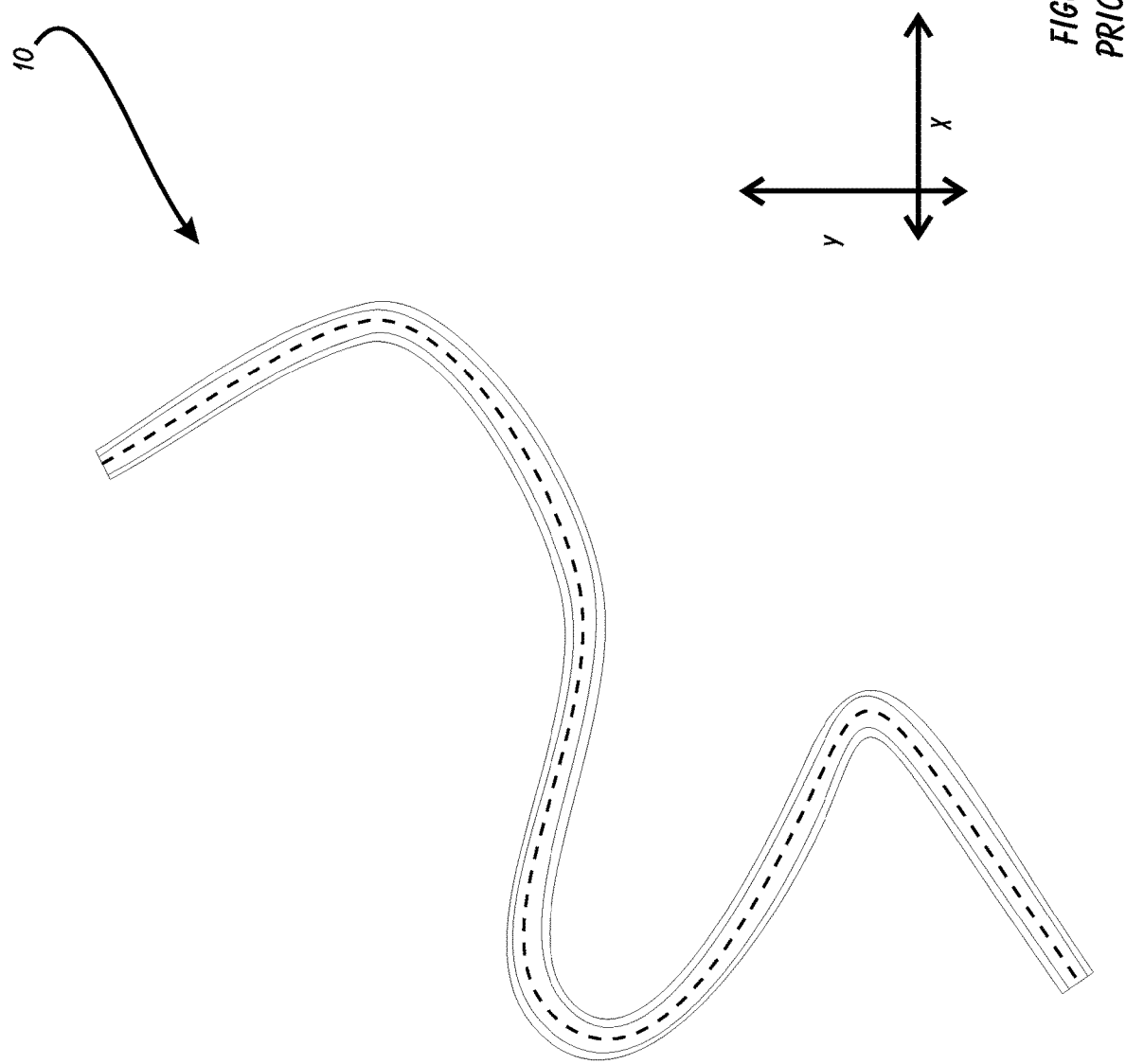
FIG. 1 is a depiction of a conventional 2-dimensional map of a roadway.

As discussed above, for development of conventional autonomous driving systems in passenger cars, 2-dimensional road map data is sufficient. FIG. 1 is a depiction of a conventional 2-dimensional map of a roadway 10 that is limited to dimensional coordinates in 2 axes (e.g. the X and Y axes as shown here). Since there is no elevation/height information, the slope and contour of the roadway cannot be utilized in the development or implementation of the actual vehicle control algorithm. These maps, widely known to have been produced by Google, typically contain sufficiently detailed data in order to allow developers to develop reliable, high-quality vehicle control systems, as described in the flowchart of FIG. 2.

Figure 2:
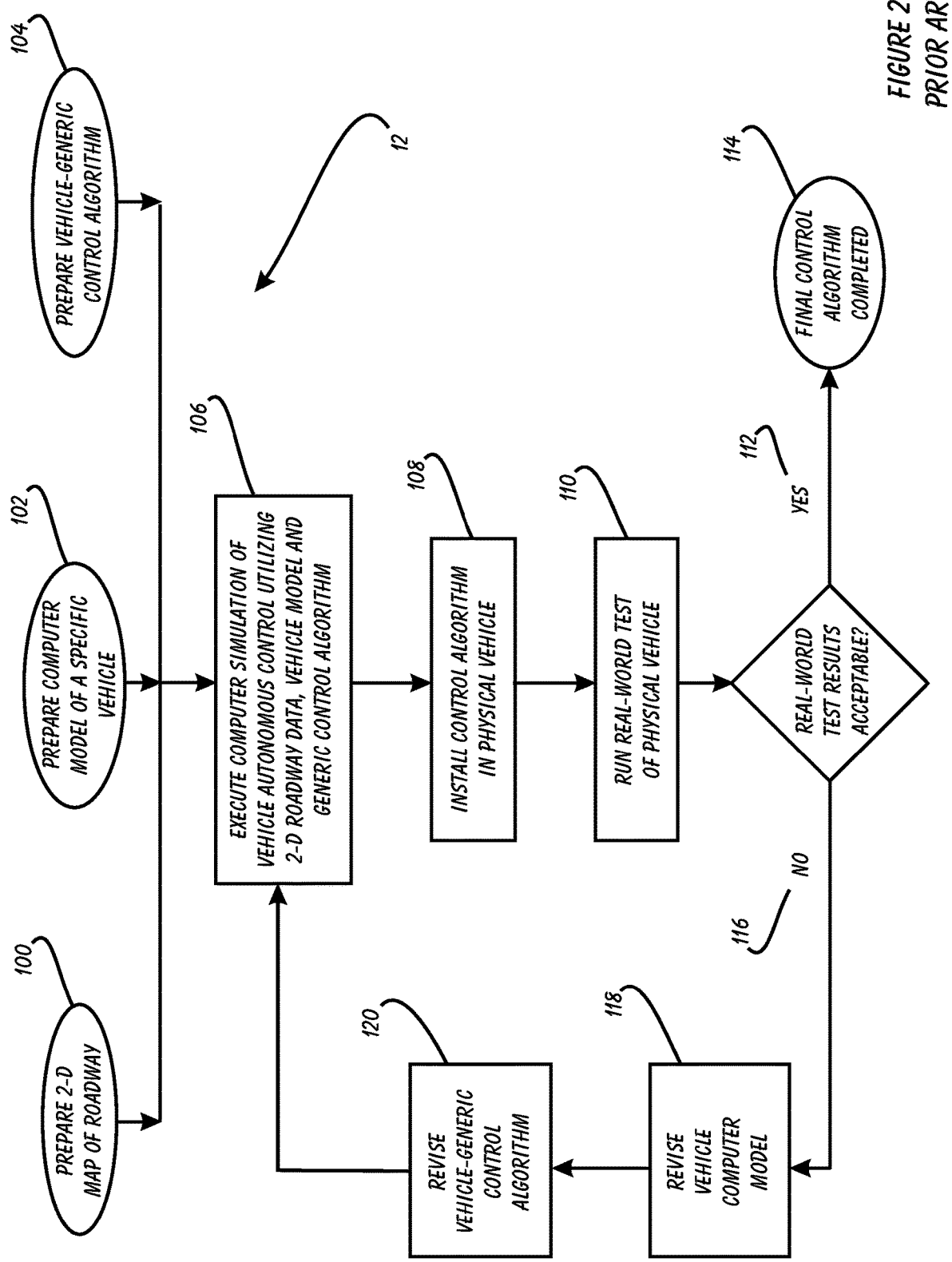
FIG. 2 is a flowchart depicting the steps of a conventional method for developing the control algorithm for an autonomous vehicle.

FIG. 2 is a flowchart depicting the steps of a conventional method for developing the control algorithm for an autonomous vehicle 12. The 2-dimensional roadway map is developed 100, a computer model is prepared for the specific vehicle that is being adapted for autonomous control 102, and the initial control algorithm is developed 104—generally developed to be generic to any vehicle (utilizing the vehicle model). These steps 100, 102, 104 can be executed in any order, but they must all be complete before proceeding to step 106—where a computer simulation is run that will execute simulated driving trips of the vehicle computer model on the 2-dimensional roadway model utilizing the control algorithm for the generic vehicle.

If any defects are detected in the simulation, then the computer model of the vehicle and the control algorithm are revised as necessary until a satisfactor result is achieved in the simulated autonomous driving test.

Once a satisfactory set of simulations are run, the control algorithm is installed in an actual physical vehicle 108. Then, the vehicle is allowed to run autonomously on preselected roadways 110. If these real-world tests reveal acceptable performance by the vehicle (being driven by the control algorithm) 112, then the latest version of the control algorithm is determined to be the final version.

If, however, the real-world driving tests are not successful 116, it is typically necessary to revise both the vehicle computer model 118 and the control algorithm 120, since it is virtually impossible to know where the source of the control error is. At that point, the computer simulation is ready to be re-run 106 before re-running the real-world test.

As discussed previously, there are numerous problems with this conventional development approach when attempting to develop a control system for a large cargo vehicle, such as a semitrailer truck. Semitrailer trucks present numerous challenges that either don't exist, or are very minimal when dealing with passenger vehicles. First, a semitrailer truck is much heavier, longer and taller than a passenger vehicle. This results in very complex vehicle performance dynamics that are much more dependent upon the road terrain, contour and elevation changes. Second, the cargo loading in a semitrailer is inconsistent from shipment to shipment. Consequently, the center of gravity of the overall vehicle changes virtually every shipment. This shifting center makes understanding and predicting the vehicle's performance even more complicated (and therefore difficult to model). If is for these reasons that the system and method of the present invention was developed.

Figure 3:
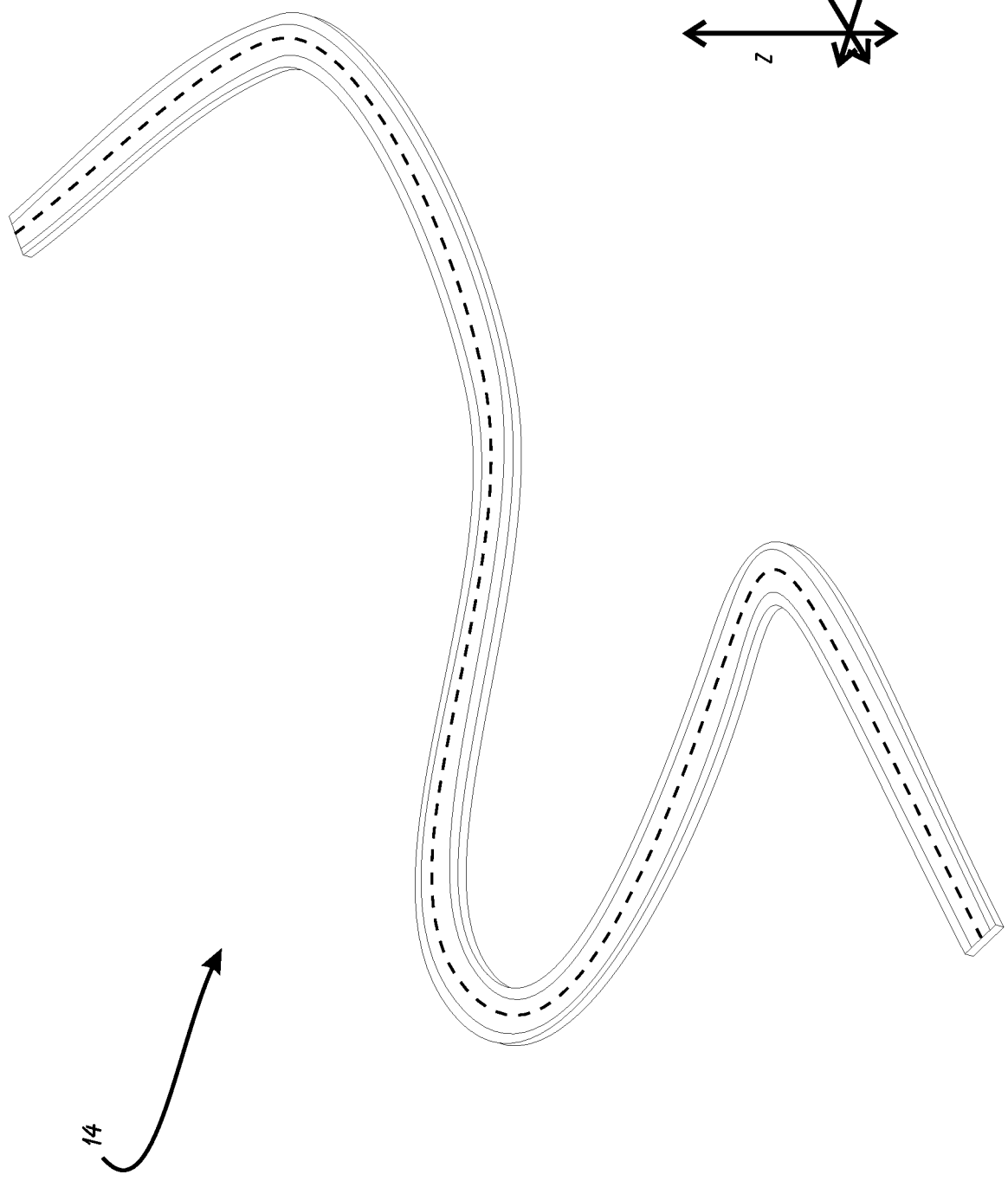
FIG. 3 is a depiction of a 3-dimensional roadway map such as is used in the system and method of the present invention.

The present invention can best be understood by initial consideration of FIG. 3.[5] FIG. 3 is a depiction of a 3-dimensional roadway map 14 such as is used in the system and method of the present invention. This map 14 is preferably developed by taking a specific roadway portion (e.g. from San Diego to Orange County along Interstate Highway 5) and collecting 3-dimensional data utilizing GPS and LIDAR so that the map 14 includes not only X and Y axis data, but also Z-axis (elevation) data. The raw X, Y, Z data is smoothed in order to eliminate unwanted noise, and then is implemented as discussed below in FIG. 4.

As used throughout this disclosure, element numbers enclosed in square brackets [ ] indicates that the referenced element is not shown in the instant drawing figure, but rather is displayed elsewhere in another drawing figure.

Figure 4:
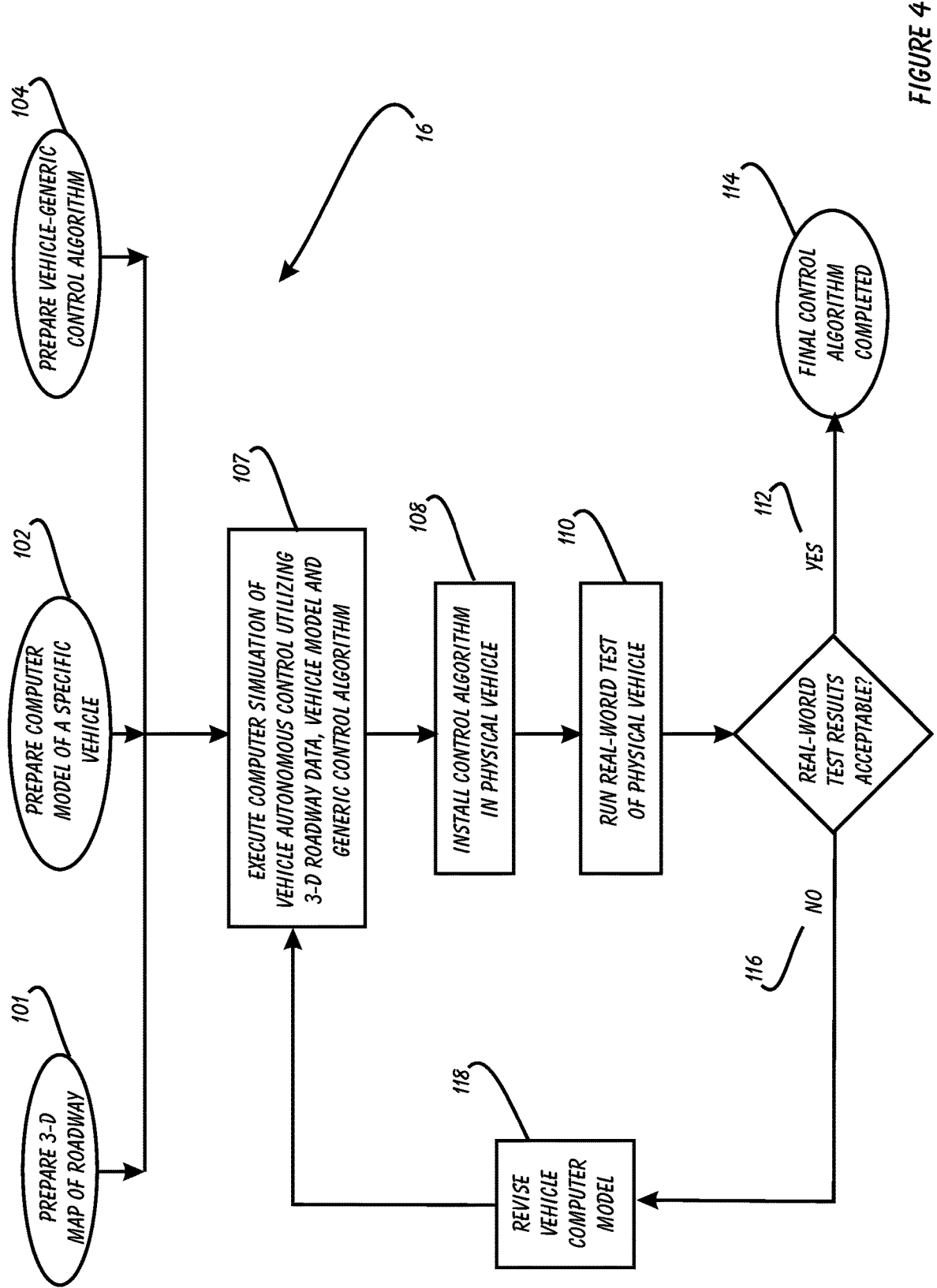
FIG. 4 is a flowchart depicting a preferred embodiment of the steps of the method for developing the control algorithm for an autonomous vehicle.

FIG. 4 is a flowchart depicting a preferred embodiment of the steps of the method for developing the control algorithm for an autonomous vehicle 16. The initialization steps for this improved method 16 involves preparing the 3-dimensional roadway map 101, the vehicle computer model 102, and the control algorithm 104. Next, the simulation is run using these components 107, and fine-tuned until the simulated driving excursion is executed acceptably. The control algorithm is then installed into the real-world vehicle 108 and tested on the actual 3-D mapped section of roadway 110. As with the prior approach, if the real-world test results are acceptable 112, then this version of control algorithm is considered to be the final version 114.

The critical benefit of the improved system of the present invention arises for the (common) circumstance where the real-world driving test is not successful 116. Here, because the control algorithm was developed, and the simulation was run utilizing much more detailed and rich data on the roadway, there is no need to re-address or revise the control algorithm. This is because the simulations that were run have already required that the control algorithm account for not only the roadway shape in two dimensions (X- and Y-), but also for the roadway's shape in the Z-direction. The additional 3-D map [14] data related to the roadway's shape in the Z-direction (slopes, banks, apexes, dips, etc.) provides the necessary input to the simulation system so that the vehicle control algorithm has already been exhaustively and thoroughly tested before the real-world road test. Consequently, only the vehicle computer model will be revised 118 (particularly as the control algorithm evolves as a result of simulations on more and more 3-D roadway maps).

Because of the complexity of the dynamics of large cargo vehicles, such as semitrailers, the simplification of the method 16 by eliminating the need for revising the control algorithm in the iterative simulation and testing cycle is substantial. In fact, it has been observed that it is nearly non-feasible to attempt to even try to develop a control algorithm for cargo vehicles without the use of a 3-dimensional roadway map for testing and development.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for developing a control algorithm for autonomous vehicles, comprising the steps of:
   preparing mapping data for a selected roadway, said mapping data including dimensional data in three relatively perpendicular axes;
   preparing a computer model emulating a performance of a selected vehicle;
   preparing a control system configured to control vehicles;
   executing a simulated driving excursion on a programmable computer utilizing said mapping data, said computer model, and said control system;
   executing a driving test of an actual vehicle responsive to said mapping data and said simulated driving excursion; and
   revising said computer model responsive to said driving test.

2. The method of claim 1, wherein said control system of said preparing step is compatible with passenger vehicles.

3. The method of claim 1, wherein said control system of said preparing step is compatible with large payload vehicles.

4. The method of claim 1, wherein said control system of said preparing step is compatible with passenger vehicles and large payload vehicles.

5. The method of claim 1, wherein said control system remains unchanged responsive to said driving test and regardless of results of said driving test.

6. A method for developing a control algorithm for autonomous vehicles, comprising the steps of:
preparing mapping data for a selected roadway, said mapping data including dimensional data in three relatively perpendicular axes;
preparing a computer model emulating a performance of a selected vehicle;
preparing an initial control algorithm configured to control vehicles;
executing a simulated driving excursion on a programmable computer utilizing said mapping data, said computer model, and said initial control algorithm;
executing a driving test of an actual vehicle responsive to said mapping data and said simulated driving excursion; and
revising said computer model responsive to said driving test.

7. The method of claim 6, wherein said initial control algorithm of said preparing step is compatible with passenger vehicles.

8. The method of claim 6, wherein said initial control algorithm of said preparing step is compatible with large payload vehicles.

9. The method of claim 6, wherein said initial control algorithm of said preparing step is compatible with passenger vehicles and large payload vehicles.

10. The method of claim 6, wherein said initial control algorithm remains unchanged responsive to said driving test and regardless of results of said driving test.

11. A method for controlling autonomous vehicles, comprising the steps of:
preparing mapping data for a selected roadway, said mapping data including elevation of said roadway;
preparing a computer model emulating a performance of a selected vehicle;
preparing a non-vehicle-specific control system configured to control autonomous vehicles;
executing a simulated driving excursion on a programmable computer utilizing said mapping data, said computer model, and a non-vehicle-specific control system;
executing a driving test of an actual vehicle responsive to said mapping data and said simulated driving excursion; and
revising said computer model responsive to said driving test.

12. The method of claim 11, wherein said non-vehicle-specific control system of said preparing step is compatible with passenger vehicles.

13. The method of claim 11, wherein said non-vehicle-specific control system of said preparing step is compatible with large payload vehicles.

14. The method of claim 11, wherein said non-vehicle-specific control system of said preparing step is compatible with passenger vehicles and large payload vehicles.

15. The method of claim 11, wherein said non-vehicle-specific control system remains unchanged responsive to said driving test and regardless of results of said driving test.

16. The method of claim 1, wherein said mapping data is a three dimensional map (3-D map).

17. The method of claim 1, wherein said mapping data is collected by using a Global Positioning System (GPS) sensor and Light Detection and Ranging (LiDAR) sensor.

18. The method of claim 6, wherein said mapping data includes roadway shape data, wherein said roadway shape data includes slopes, banks, apexes, and dips.

19. The method of claim 11, further comprising:
eliminating noise in said mapping data by smoothing raw data of said mapping data.

20. The method of claim 11, wherein said autonomous vehicles are semitrailer trucks.

* * * * *